United States Patent Office 3,445,786
Patented May 20, 1969

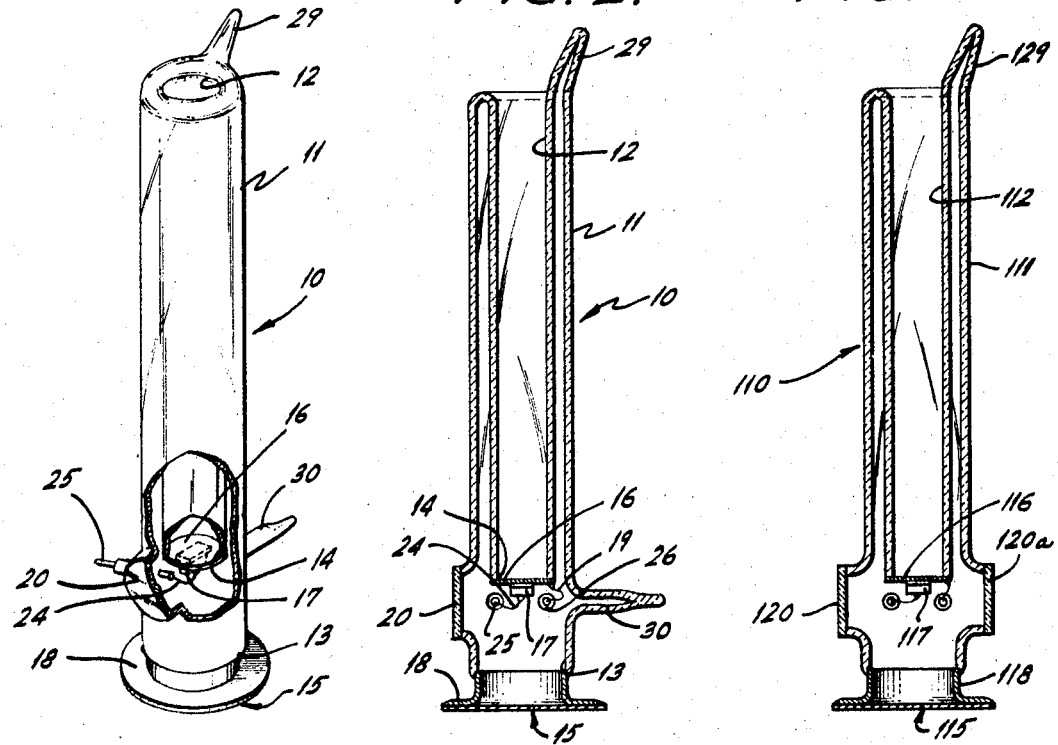
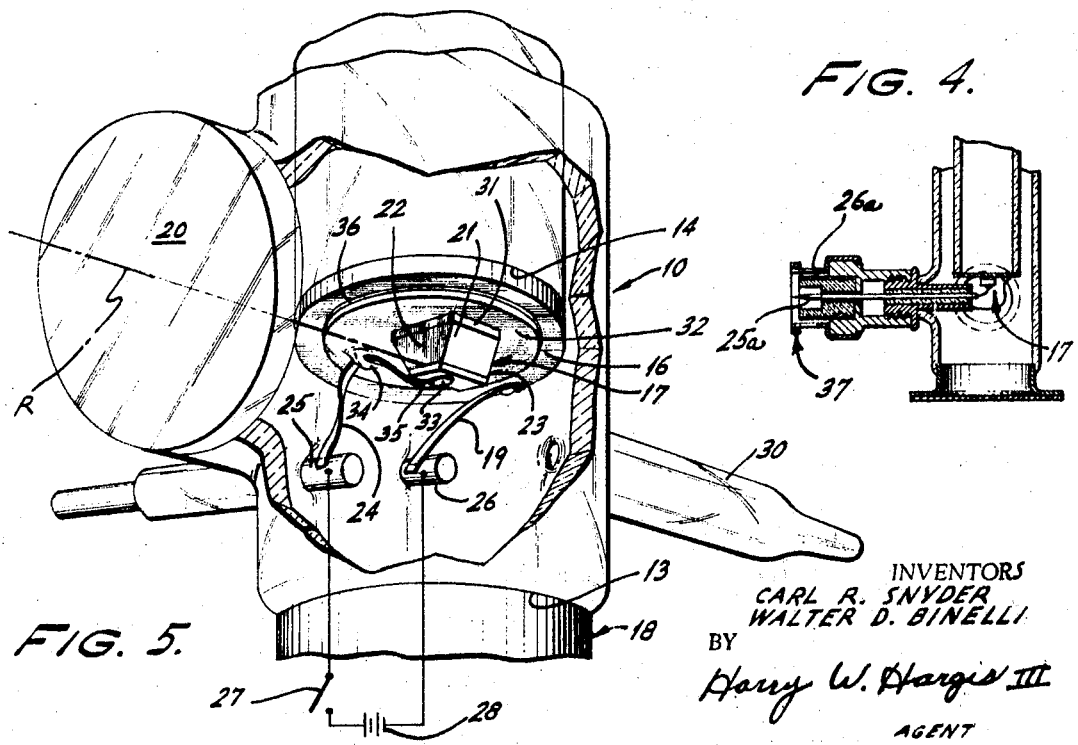

3,445,786
CRYOGENICALLY COOLED ELECTRO-OPTICAL APPARATUS
Carl R. Snyder, Edison, and Walter D. Binelli, Pottstown, Pa., assignors to Philco-Ford Corporation, Philadelphia, Pa., a corporation of Delaware
Filed Feb. 9, 1965, Ser. No. 431,308
Int. Cl. H01s 3/04; H01j 7/24; F25b 19/00
U.S. Cl. 331—94.5                                    3 Claims

ABSTRACT OF THE DISCLOSURE

Cryogenically cooled electro-optical apparatus includes an outer tubular shell of thermally and electrically insulative material having a reentrant portion forming an inner, coaxial tubular shell spaced from the outer shell and coextensive with a substantial portion of the outer shell. The shells have axially spaced end apertures presented in the same direction. A first sealing disk extends over the end aperture of the outer shell and a second sealing disk extends over the end aperture of the inner shell. A radiant energy transmissive window is provided over an opening in a lateral wall portion of the outer shell opposite the sealing disk for the inner shell. The second sealing disk supports an electro-optical device, such as a laser, in optical alignment with the energy transmissive window. Cryogenic cooling means for the laser is introduced into the bore of the inner shell and in high thermal exchange relation with the second sealing disk upon which the laser is disposed.

---

This invention relates to cryogenic cooling apparatus, and more particularly to the construction of apparatus useful in the cryogenic cooling of electro-optical devices, such for example as lasers.

Power required to induce lasing in a solid state laser device is substantially reduced when the device is cooled to cryogenic temperatures. A useful temperature of about 77° K. is achieved by immersing the laser device in liquid nitrogen subjected to atmospheric pressure. However, while satisfactory cooling is achieved in this manner, ebullition of the nitrogen has adverse effects upon optical characteristics of the system.

It is an objective of this invention to provide improved cryogenic cooling apparatus for effectively cooling an electro-optical device.

It is a further objective of the invention to provide improved cryogenic cooling means of a construction which lends itself to simple and inexpensive assembly.

It is a still further objective of the invention to provide improved cooling means that not only facilitates assembly, but also establishes and maintains accurate positioning of an electro-optical device.

In achievement of the foregoing and other objectives, a prefered embodiment of the invention comprises an outer tubular shell of thermally and electrically insulative material having a reentrant portion forming an inner, coaxial tubular shell spaced from the outer shell and coextensive with a substantial portion of the latter, the shells having axially spaced open ends presented in the same direction. First sealing means extends over the open end of the outer shell and a second sealing means extends over the open end of the inner shell. Radiant energy transmissive window means is provided in a lateral wall portion of the outer shell opposite the recited sealing means for said inner shell, and the second sealing means is adapted to carry an electro-optical device in optical alignment with the energy transmissive window.

With the reentrant portion of the outer shell presented upwardly, liquid coolant is introduced into the bore of the inner shell, where it resides in thermal contact with the sealing means upon which the radiative device is disposed. It will therefore be appreciated that the device is cooled to cryogenic temperatures by the boiling liquid coolant without immersal of the radiative device in the coolant. In such a construction ebullition does not interfere optically with operation of the radiative device.

It will be understood that while the apparatus briefly described above is particularly adapted for use with a liquid coolant, it is well adapted for cooling by other known cryogenic cooling devices, such for example as a cryostat.

The manner in which the foregoing as well as other objects and advantages of the invention may best be achieved will be understood from a consideration of the following description, taken in light of the accompanying drawing in which:

FIGURE 1 is a slightly enlarged perspective showing, with parts broken away, of apparatus embodying the invention;

FIGURE 2 is a sectional view in elevation, of the apparatus illustrated in FIGURE 1;

FIGURE 3 is a sectional view similar to FIGURE 2, and illustrating a modified embodiment of the invention;

FIGURE 4 is a view similar to FIGURE 3, and illustrating another modified embodiment of the invention; and FIGURE 5 is a substantially enlarged perspective view, from another angle, of a portion of the apparatus illustrated in FIGURES 1 and 2, and showing in more detail constructional features characterizing the invention.

With more particular reference to the drawing, and first to FIGURES 1, 2 and 5, the invention is embodied in flask means 10 comprising an outer tubular shell 11 of thermally and electrically insulative material, such as Corning borosilicate type glass, for example of the kind known as No. 7052. Tubular shell 11 has a reentrant portion forming an inner, coaxial tubular shell 12 spaced from the outer shell and coextensive with a substantial portion of the latter.

Shells 11 and 12 preferably are generally cylindrically-shaped and have axially spaced open end portions 13 and 14 to which metal discs 15 and 16, respectively, are hermetically sealed. Disc 16 is hermetically sealed directly to the end portion 14 of the inner shell, and disc 15 is hermetically sealed to the flange of a ring 18 also hermetically sealed to the end portion 13 of the outer shell. Discs 15 and 16, and the flanged ring 18, preferably are made of an alloy which has thermal deformation characteristics closely matching those of the glass. An iron-cobalt-nickel alloy such, for example, as the alloy sold under the trademark Kovar has been found suitable for this purpose.

A generally planar, radiant energy transmissive window 20, also preferably made of Corning No. 7052 glass (No. 7056 also is suitable) is hermetically sealed to the rim of an opening provided in a lateral wall portion of outer shell 11 opposite disc 16. Sapphire also is suitable for window 20, selection of one material over the other being dependent upon the operating wave length of the apparatus.

With particular reference to FIGURE 5, a radiative element 17, such for example as a laser device, is carried by and electrically connected to Kovar disc 16 through an intermediate smaller Kovar disc 32 and has its line of emission optically aligned with energy transmissive window 20. Laser device 17 may comprise a diffused P-N junction gallium-arsenide optical diode 21 that emits light in the near-infrared region of the spectrum when forward biased. In accordance with usual practice, diode 21 has nonparallel side faces and flat end faces 22 and 23. Each of faces 22 and 23 is accurately positioned perpendicular to the junction plane of the diode and substantially parallel to window 20. Such devices are known, and require no detailed description herein.

Kovar disc 16 comprises one electrode for diode 21, and a ribbon shaped Kovar wire 24 soldered to the diode by means of a body of indium solder 33 comprises the other electrode. Kovar pins 25 and 26 extend generally radially through, and are hermetically sealed to, outer shell 11. Pin 25 is electrically connected to electrode 24, and pin 26 is electrically connected to electrode 16 by a ribbon shaped Kovar wire 19 as shown in FIGURE 5. It is important that the P-contact (lead wire 24) be adequately supported to minimize microphonics. Conveniently, a glass bead 34 (Corning glass 7052) may be formed on disc 32 and lead 24 imbedded therein as shown, to provide support for the P-contact lead wire. The actual connection of wire 24 to the diode comprises, preferably, a section of gold wire 35 extending between the tip of wire 24 and the indium solder 33. Pins 25 and 26 serve as terminals for connecting the diode to a suitable source of energy 28 through switch means 27, as is shown diagrammatically in FIGURE 5.

An exhaust tubulation 29 is provided in the region of juncture of the inner and outer shells and provides communication both with space between the inner and outer shell and with the region within which the diode is disposed so that these areas can be evacuated. Another such tubulation 30 conveniently is provided in a lower region of the outer shell, substantially opposite window 20.

In the assembly of the above described apparatus, disc 16 is first sealed to tube 12. Tube 12 is disposed coaxially within tube 11, in the desired spatial relation, and adjacent ends are sealed to provide the illustrated reentrant configuration of the inner tube relative to the outer tube. Also at this time, the various tubulations may conveniently be formed.

After the tubular elements 11 and 12 have been joined, the window 20 is mounted and sealed to an enlarged tubulation formed in the lateral wall portion of outer tube 11, in accordance with known glass sealing practice. Suitably oxidized surfaces of Kovar flange means 18 and pins 25 and 26 are sealed to the outer shell 11 (the former to tubular end portion 13 and the latter to radially extending tubulations) also in accordance with known practices followed in the art of forming glass-to-metal seals. Preferably after the forming of the metal seals, confronting opposed surfaces of shells 11 and 12, are provided with mirror surfaces using known techniques. In operation of the apparatus these highly reflective surfaces will enhance its thermal insulative characteristics.

Laser device 17 is soldered to a Kovar disc 32, preferably using a preform 31 comprising a known tin-antimony alloy solder. At the same time lead 24 is attached to the other side of device 17 using a second preform of indium solder 33. This is done in suitable jigging under reducing atmosphere conditions.

Disc 32 is thereafter soft soldered to disc 16, by solder 36. Care is taken at this time to accurately align the end faces 22 and 23 with window 20 as described. Lead 19 is soft soldered to disc 16, and leads 24 and 19 are thereafter spot welded at their free ends to pins 25 and 26, respectively.

Kovar disc 15 is then welded to flange 18, preferably by the heliarc welding process. Lower tubulation 30 is useful during this welding operation, inasmuch as it permits bathing the interior of the device with a portion of the helium used in the welding process. Tubulations 29 and 30 are utilized, also, in silvering the inner walls to form the mirror surfaces, as well as in combination with conventional evacuation means to exhaust the space between the outer and inner shells. Following exhausting the tubulations are tipped-off, in accordance with known practice, hermetically to seal the above-mentioned space.

Having thus completed the assembly, the exposed outer surfaces of the metal parts are gold plated both for protection and to enhance their electrical conductivity. Advantageously, the final seal is metal-to-metal instead of glass-to-glass and can be effected with minium thermal stressing of the assembly. Since the welding of the outer disc to the flange is the final mechanical operation, as such, in the assembly, it will be appreciated that all adjustments and alignments of the laser can be effected just prior to this sealing.

In operation of the device in the illustrated upright position, liquid nitrogen is introduced into the bore of inner shell 12 where, under atmospheric conditions, it will boil at about 77° K. Due to the thermal insulative properties of the evacuated space and the reflective metallic coating, latent heat of vaporization is supplied substantially entirely through disc 16, with consequent cooling of the laser device.

When the diode 21 has been cooled to about 77° K., it is supplied with pulsed current from power source 28 under the control of switch means 27. As a result a coherent, highly directional, light beam represented by the broken line R is emitted with its axis perpendicular to the parallel faces of the diode. This light beam can then be modulated by varying the driving current.

It will be appreciated that the radially extending circumferentially spaced leads 25 and 26 afford a more direct connection to the laser device than do the relatively long, axially extending lead wires of known prior art flask means. Also, the apparatus is especially adaptable to the use of coaxial leads 25a and 26a as shown in FIGURE 4, which are desirable when operating at high modulation frequencies and include standard means 37 for attaching to equipment utilizing BNC connectors. In such an arrangement, the leads also extend radially through the outer shell into electrical contact with the laser device. In providing the shorter leads of the present invention, power losses characteristic of the high current operation of these devices advantageously are minimized. Also, since the boiling nitrogen is disposed to the side of disc 16 opopsite to the side upon which the laser device is mounted, its operation is not impaired by the presence of bubbles. Moreover, the heat exchange between the boiling nitrogen and the laser device is enhanced by the relatively thin, highly conductive discs 16 and 32.

While a sequence of operations useful in the assembly of the cooling device has been described, it is emphasized that other sequences may be followed. However, an important feature of the inventive construction is that final assembly of the radiative device can be carried out at one end of the device, and minimal manipulation of parts is required. This is of particular advantage in the case of the disclosed laser device 17, where it is important that window 20 be parallel to faces 22 and 23 of the diode 21.

In FIGURE 3 there is illustrated a modification of the invention involving provision, in a cooling device 110, of a pair of windows 120, 120a optically aligned with a laser device 117 carried by a disc 116 sealed to tubular shell 112. As is the case with the embodiment just described, an outer shell 111 is spaced from shell 112 and is sealed off by flanged ring 118 and disc 115. A single exhaust tubulation 129 is relied upon. A device of this type permits transmission of laser beams emitted from both parallel surfaces of the laser device 117, hence enhancing the versatility of the apparatus.

From the foregoing description it will be appreciated that the present invention provides improved cooling means for a radiative device that facilitates establishment and maintenance of accurate positioning of a radiative device with respect to elements of the cooling means.

It will be appreciated further that the invention is readily adapted for cooling electro-optical devices other than lasers. For example, photodetectors, photoemitters other than lasers, and like devices, to advantage, may be cooled by the disclosed apparatus. The foregoing as well as other modifications are contemplated within the scope of the appended claims.

We claim:
1. In cryogenically cooled electro-optical apparatus: an outer tubular shell of electrically and thermally insulative material; an inner tubular shell spaced from the outer shell, and coextensive with a substantial portion of the outer shell, the inner and outer shells being joined at adjacent first ends thereof and having axially spaced, unidirectionally presented, apertured end portions toward opposite ends of said shells; a first metallic disk extending over and sealing the apertured end of the inner shell; an electro-optical device disposed upon said first disk; means defining a radiant energy transmissive window in a side wall portion of said outer shell and in optical alignment with said device; and a second disk extending over and sealing the apertured end of said outer tubular shell; said inner tubular shell being adapted to receive means extending therewithin and for cryogenically cooling said first metallic disk and the device disposed thereon.

2. In cryogenically cooled apparatus according to claim 1, and further characterized in that the apertured end portion of said outer shell includes a circumferential, radially presented flange, and said second disk is of substantially the same diameter as said flange and is sealed thereto.

3. In cryogenically cooled apparatus according to claim 1, and further characterized in that said electro-optic device comprises a laser crystal and means for pumping said crystal.

References Cited
UNITED STATES PATENTS

| | | | |
|---|---|---|---|
| 3,130,254 | 4/1964 | Sorokin et al. | 331—94.5 |
| 3,289,100 | 11/1966 | Ballman et al. | 331—94.5 |
| 3,293,564 | 12/1966 | Fan | 331—94.5 |
| 3,303,432 | 2/1967 | Garfinkel et al. | 331—94.5 |
| 3,355,675 | 11/1967 | Varsanyi | 331—94.5 |

OTHER REFERENCES

Fowler et al.: A Luminescent Infrared Spectroscope, IBM Tech. Disl. Bull, vol. 5, No. 12, May 1963, p. 73.

DAVID H. RUBIN, *Primary Examiner.*

E. BAUER, *Assistant Examiner.*

U.S. Cl. X.R.

62—514; 250—238